March 2, 1926.

M. L. BLANTON

PILOT LAMP FOR AUTOMOBILES

Original Filed Dec. 1, 1923

1,575,525

Inventor

Mitchell L. Blanton.

By A. J. O'Brien

Attorney

Patented Mar. 2, 1926.

1,575,525

UNITED STATES PATENT OFFICE.

MITCHELL L. BLANTON, OF DENVER, COLORADO, ASSIGNOR, BY DIRECT AND MESNE ASSIGNMENTS, TO F. J. McMANAMAN, OF DENVER, COLORADO.

PILOT LAMP FOR AUTOMOBILES.

Application filed December 1, 1923, Serial No. 678,064. Renewed January 2, 1926.

*To all whom it may concern:*

Be it known that I, MITCHELL L. BLANTON, a citizen of the United States, residing at Denver, the city and county of Denver, and State of Colorado, have invented certain new and useful Improvements in Pilot Lamps for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to pilot lamps for automobiles.

It is well known to those who have driven automobiles over strange roads at night that the ordinary stationary headlights are woefully inadequate. They may be perfectly satisfactory on a straight road, but they do not illuminate the roads on a turn, for the reason that they are rigidly attached to the automobile chassis and therefore do not point in the direction in which the front end of the car is traveling, except on a straight road. In order to provide a source of illumination that shall overcome the objection, a large variety of dirigible headlights have been invented and patented. This type of lamp, although it does theoretically solve the problem of night driving, has several serious faults, due primarily to the fact that it is movable and connected by links or cables to the steering gear. The result of the many movable parts connected with the ordinary dirigible headlight is that the parts soon become loose and rattle in a highly objectionable manner. Spotlights mounted on the windshield frame or in the windshield itself and capable of universal movement, have been invented and are extensively employed, but these require manual operation at turns and critical parts of the road, which means that the driver will have his attention divided between driving and operating the spotlight at what is often the most dangerous parts of the road.

It is evident that if a light could be provided that would always point in the direction in which the front wheels are traveling and which at the same time shall have no movable parts, it will overcome the objections pointed out and provide the desired dirigibility of the light.

It is the object of the present invention to produce a new combination of elements, by means of which it will be practicable to illuminate the road in the direction that the front wheels are traveling and to dispense with all movable parts.

My invention can be best understood and described when reference is had to the accompanying drawing in which the present preferred embodiment of my invention is shown, and in which.

The same reference characters will be employed to designate the same parts throughout the several views.

Figure 1:
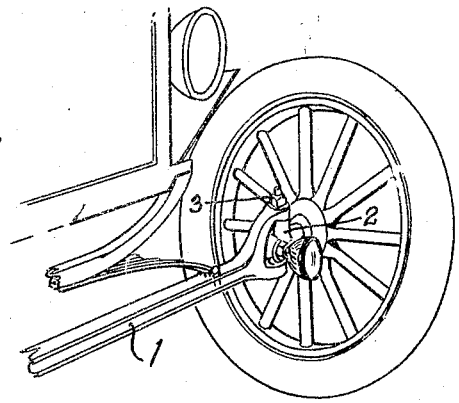
Fig. 1 is a perspective view showing a portion of an automobile with my improved lamp in place thereon.
Figure 2:
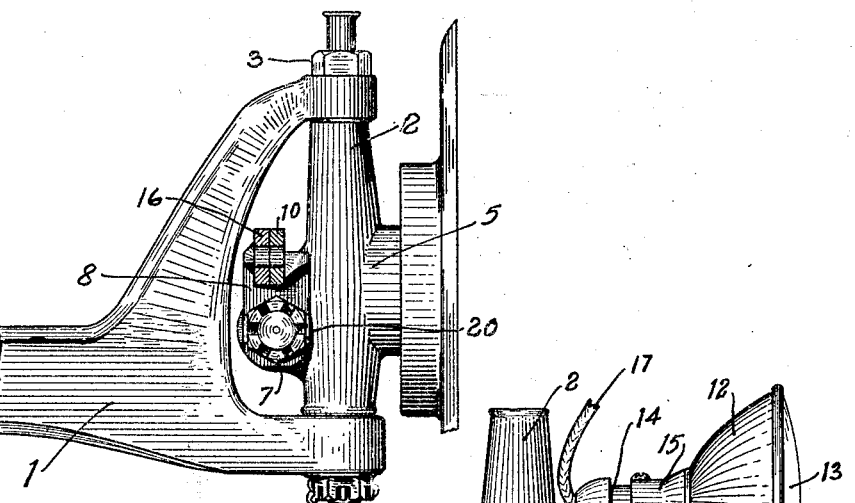
Fig. 2 is a view, on an enlarged scale, of a portion of the front axle, the steering knuckle and a part of the hub of the front wheel, a part of this view being a section taken on line 2—2, Fig. 3.
Figure 3:
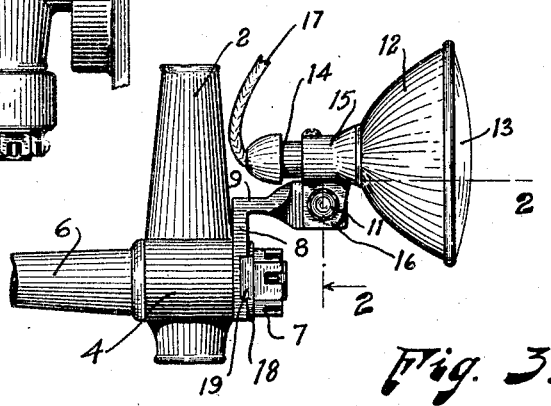
Fig. 3 is a side elevation, the steering knuckle showing more clearly the manner in which the lamp is secured thereto.

Numeral 1 represents the front axle of an automobile to which the steering knuckle or spindle body 2 is attached in the usual manner by means comprising the spindle bolt 3. The spindle body has a projection 4 on one side and an axle 5 on the opposite side thereof. A spindle arm 6 has one end which passes through the hole in the projection 4 and is held in place by a nut 7. A bracket 8 is clamped between the front side of the projection 4 and the nut 7 and has the upper portion 9 bent at right angles to the body portion thereof. The front end of the part 9 is twisted so that it will be in a vertical plane, as indicated by numeral 10 in Fig. 2. The front end of the horizontal arm 9 of the bracket 8 is perforated for the reception of the bolt 11, by means of which the lamp is secured in place thereon. The lamp may be constructed in the usual manner with a reflector 12, lens 13 and lamp socket 14. The lamp is secured to a tubular member 15, which has a downwardly projecting ear 16 through which bolt 11 extends. The electric conductors 17 extend to the instrument board or to a suitable switch on the steering post and is connected with the lighting system of the automobile in such a manner that by closing a switch the lamp may be illuminated. The lamp is adjusted at the proper inclination in the vertical plane and clamped in the adjusted position by means of a bolt 11.

For the purpose of locking the nut 7 against rotation I provide a thin, oblong washer 18 between the nut and the front side of the projection 4, one end of this washer being bent down along the side of the projection as indicated by numeral 19, while the other end 20 is bent against the nut.

Having now described my invention, what I claim as new is:

In combination with an automobile, a bracket having a plurality of arms, one arm being mounted behind the spindle arm nut, a locking device between said arm and said nut, said bracket having another arm extending at right angles to the first mentioned arm and having its end twisted through an angle of ninety degrees, said end having an opening for the reception of a bolt.

In testimony whereof I affix my signature.

MITCHELL L. BLANTON.